United States Patent [19]
Peterson

[11] 4,261,714
[45] Apr. 14, 1981

[54] FILTERING APPARATUS

[75] Inventor: Harley G. Peterson, Lacrescenta, Calif.

[73] Assignee: Joy Manufacturing Company, Pittsburgh, Pa.

[21] Appl. No.: 900,354

[22] Filed: Apr. 26, 1978

[51] Int. Cl.³ .............................................. B01D 46/02
[52] U.S. Cl. ................................ 55/341 MC; 55/302; 55/378
[58] Field of Search ................ 55/96, 97, 291, 293, 55/302, 303, 341 NT, 304, 305, 341 MC, 378

[56] References Cited

U.S. PATENT DOCUMENTS

| | | | |
|---|---|---|---|
| 1,784,339 | 12/1930 | Clasen et al. | 55/288 |
| 2,201,520 | 5/1940 | Callahan | 55/291 |
| 2,781,104 | 2/1957 | Fischer | 55/304 |
| 2,932,362 | 4/1960 | Roper | 55/304 |
| 3,057,137 | 10/1962 | Perlis et al. | 55/303 |
| 3,266,225 | 8/1966 | Barr | 55/303 |
| 3,372,534 | 3/1968 | Hysinger | . |
| 3,375,641 | 4/1968 | Labbe | 55/302 |
| 3,646,595 | 2/1972 | Williams | 55/284 |
| 3,850,596 | 11/1974 | Fisher et al. | 55/341 NT |
| 3,877,899 | 4/1975 | Bundy et al. | . |
| 3,964,883 | 6/1976 | Nakao | . |
| 4,082,523 | 4/1978 | Pausch | 55/293 |

FOREIGN PATENT DOCUMENTS 2018011  11/1971  Fed. Rep. of Germany ..... 55/341 NT

OTHER PUBLICATIONS

Thermo-Flex-Western Precipitation, Catalog F106, Joy Mfg. Co., 10/1968, pp. 1-4.

Primary Examiner—Bernard Nozick
Attorney, Agent, or Firm—J. Stewart Brams

[57] ABSTRACT

A gas filtering bag house having a stepped partition intermediate the bags and the hopper with the gas inlet located in side wall below partition at maximum spacing of partition and hopper—The baghouse including walkway intermediate bay height and overlying other bags.

8 Claims, 4 Drawing Figures

FILTERING APPARATUS

BACKGROUND OF THE INVENTION

This invention relates to the type of gas filtering apparatus known in the gas cleansing art as a baghouse filter. Such baghouse filters commonly include an enclosure or housing which encloses an array of elongated, tubular filter bags and a hopper or dust collection bin subjacent to the filter bags and separated therefrom by a partition known as a thimble floor or tube sheet. The tube sheet includes a plurality of flanged perforations, each of which flanges is adapted to have secured thereto the open end of the filter bag whereby the interior of the filter bag communicates through the respective perforation with the dust collection bin. The baghouse is provided with suitable ductwork and valve or damper means whereby dirty effluent gas to be filtered may be passed through the perforations in the tube sheet into the interior of each respective filter bag and thence through the fabric of the filter bags whereby dust or other foreign particulate matter entrained in the gas stream is arrested in the well known manner. The cleansed effluent gas is then passed from the baghouse enclosure to the atmosphere by way of suitable outlet or exhaust means. Periodically, the filter bags are cleaned as by rapping or by reverse flow of air or gas through the bag fabric to collapse the bags and dislodge the collected duct adhering to the interior of the bag. The dust then falls lengthwise of the bags and through the respective tube sheet perforations into the dust collection bin for subsequent disposal.

Although many such prior baghouse filters have generally served their intended purposes they have nevertheless been subject to certain limitations. For example, a pitched roof has been provided for many prior baghouse enclosures to limit snow loading, eliminate rain water accumulation problems and the like. One such roof structure is illustrated in U.S. Pat. No. 3,266,225. Although providing certain benefits as noted, pitched roof designs known heretofore have resulted in substantial wasted interior space directly beneath the roof within the enclosure inasmuch as the uniform length filter bags commonly used have extended upwardly a fixed distance from the flat thimble floor and have therefore terminated at a common level below the lowest interior extent of the pitched roof. In the prior art the only way to avoid such wasted space has been to use non-uniform filter bags of different length.

In a more general context it will be seen that the design parameters of prior baghouse enclosures often have been dictated in part by factors unrelated to the desired filtering capacity of the unit. This in turn has led to the construction of enclosures which are larger than absolutely necessary for the desired filtering capacity and this is particularly undesirable in the technology of unitized or modular baghouse structures which are fabricated in the plant for shipment as a completed unit to an assembly site as opposed to being fabricated on site.

Another aspect of baghouse design that has received considerable attention is personnel safety. For example, normal baghouse filter operating procedures call for periodic inspection and replacement of the filter bags which are subject to progressive wear during the successive filtering and cleaning cycles. Thus, in prior baghouses various configurations of both thimble floor passages and elevated walkways have been provided whereby personnel may gain the required access to all of the filter bags. Various approaches to ensure the safety of these personnel during baghouse inspections have been proposed. For example U.S. Pat. No. 3,850,596 discloses a baghouse including elevated walkways which are wider than conventional baghouse walkways, and which, in fact, are wider than the spacing between the groupings or banks of filter bags on either side thereof. To obviate problems of physical interference with the adjacent filter bags, the walkways are provided with pivot means whereby they may be selectively pivoted to a noninterfering position when not in use.

Filter bag cleaning apparatus and processes are another area which has received considerable attention in the art inasmuch as effective filter bag cleaning is necessary for efficient filter operation. Prior approaches to filter bag cleaning have included rapping devices of various designs, and the use of gas pressure differentials imposed across the fabric of the filter bags for cleaning thereof. For example, with regard to this latter approach U.S. Pat. No. 3,266,225 discloses filter bag cleaning by gradual deflation of the filter bags through the gradual imposition of a reverse gas flow inwardly through the bag fabric and into the interior of the filter bags. Subsequently, the reverse gas flow is terminated and the normal gas flow quickly re-established to rapidly reinflate the filter bags thereby physically shaking the bags to dislodge the dust therefrom.

The present invention contemplates novel improvements to these and other aspects of baghouse filters including but not limited to elimination of wasted space directly beneath the pitched roof of a baghouse enclosure, and improved elevated walkway arrangements whereby the walkway is widened in conjunction with an overall narrowing of the housing structure and without any substantial reduction in the baghouse filtering capacity or any adverse effect on operational characteristics. An additional improvement according to the present invention involves a novel process and apparatus for reverse gas flow to provide superior filter bag cleansing.

These and other objects and advantages of the invention are more fully specified in the following description with reference to the accompanying figures in which.

Figure 1:
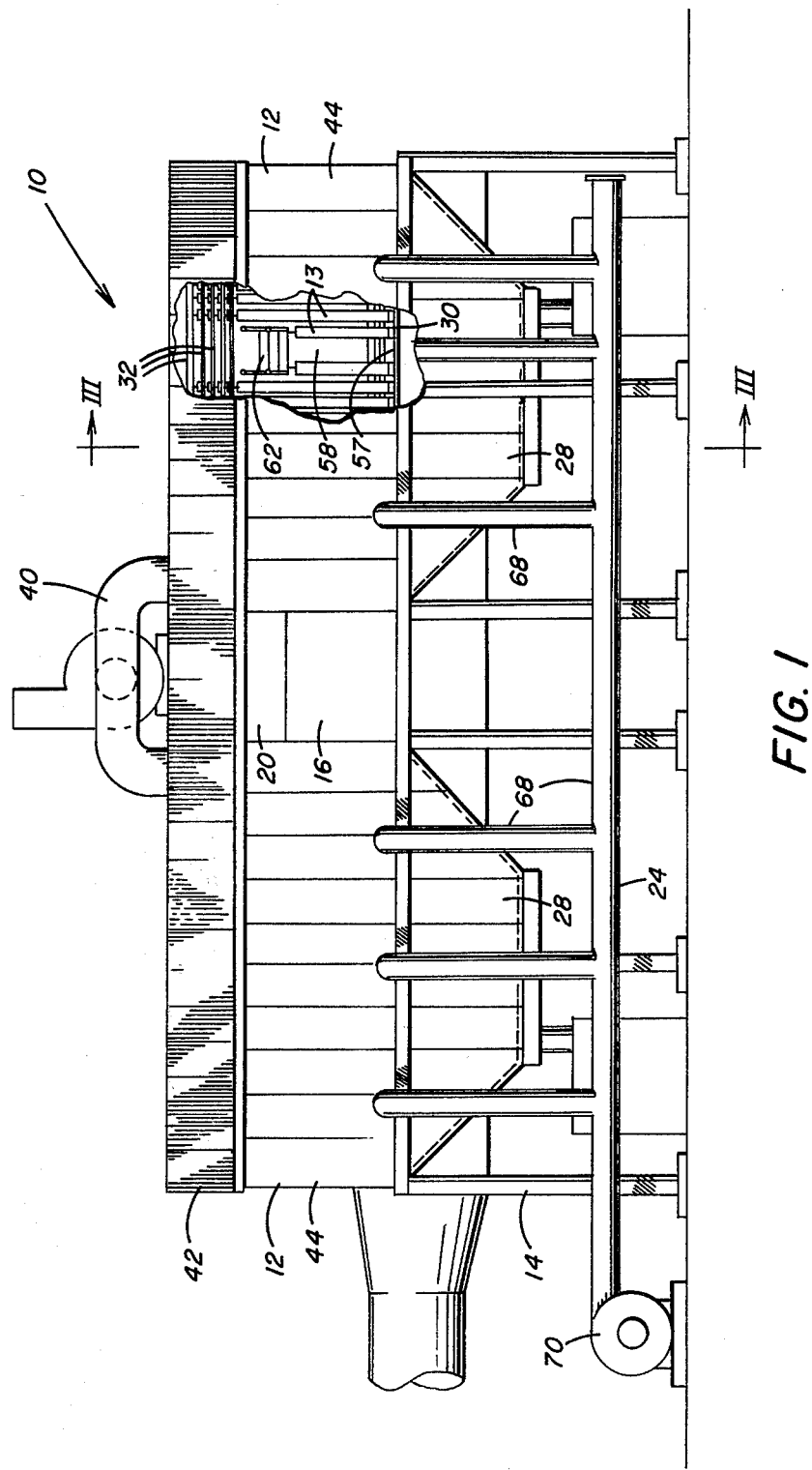
FIG. 1 is a side elevation, partially cut away, of a baghouse filter apparatus constructed according to the principles of the present invention.

There is generally indicated at 10 in FIG. 1 a baghouse filtering apparatus adapted for filtering dirty effluent gases from, for example, a coal burning power plant or an industrial process prior to release of the effluent gases to the atmosphere. Accordingly, baghouse 10 comprises plural, cooperably assembled, rigid, modular housing or enclosure units 12 (FIGS. 1 and 3) which are supported by a suitable structural framework 14.

Each enclosure module 12 has defined therewithin an upper filter bag retention space 26 and a hopper or collection bin 28 located directly subjacent bag retention space 26 and separated therefrom by a generally laterally extending wall in the form of a formed or fabricated, perforated partition 30 known as a thimble floor or tube sheet. Plural, elongated, tubular filter bags 13 formed from any suitably flexible filter medium such as fiberglass fabric extend in generally parallel relation to form a filter bag array within bag retention space 26 of each modular enclosure 12 intermediate the thimble floor 30 and respective filter bag retaining support brackets 32 located within an upper portion of the bag retention space 26. Each filter bag 13 has a lower open end 13a which is secured to a flange or thimble 36 rigidly affixed to thimble floor 30 in the conventional manner to communicate through a respective perforation 38 in the thimble floor with hopper 28, and an upper closed end 13b which is retained by any suitable retention means such as an elongated nut and bolt assembly 37 whereby each filter bag 13 is maintained in longitudinal tension.

Figure 3:
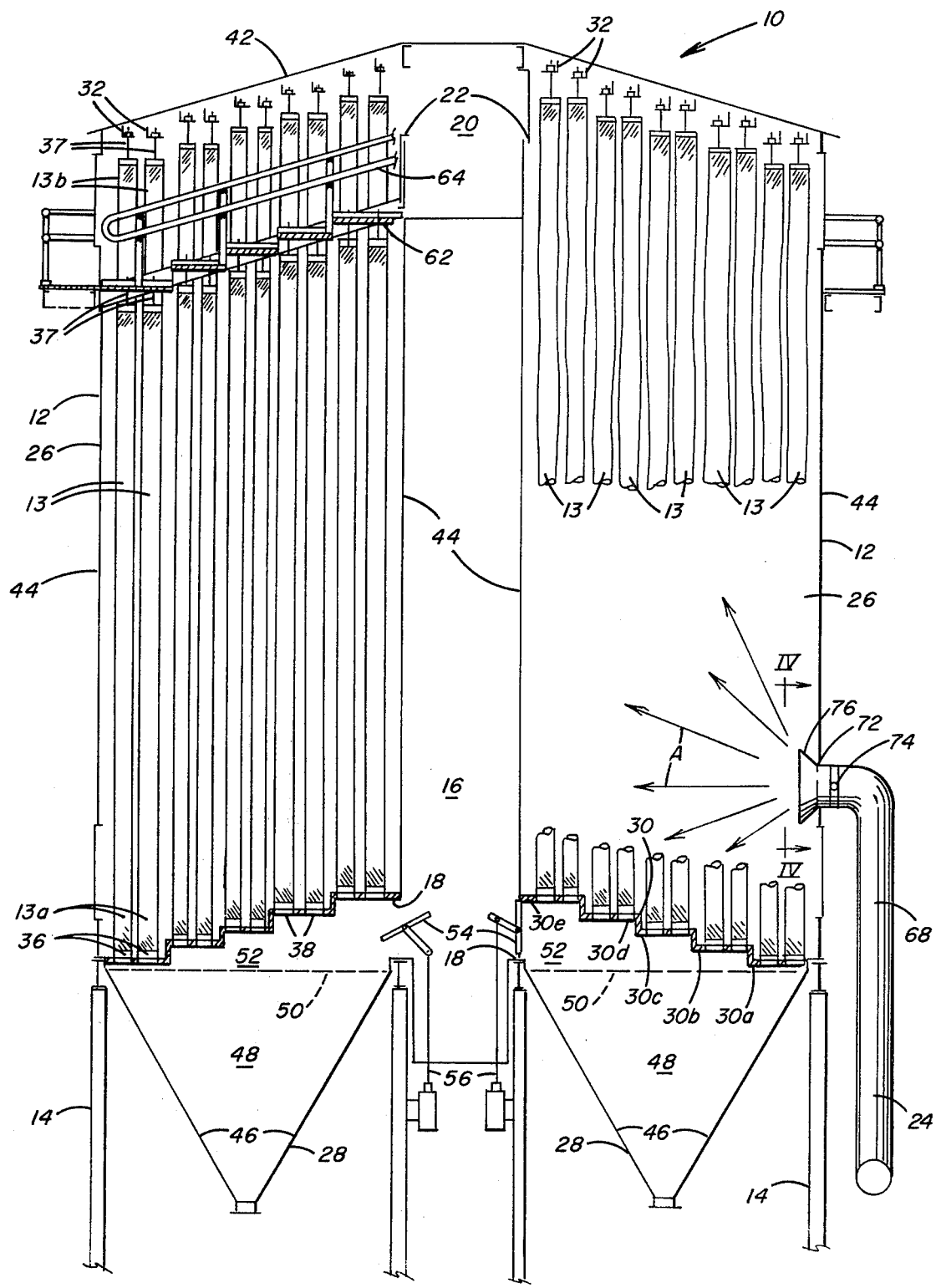
FIG. 3 is a transverse section taken on line III—III of FIG. 1.

As shown in FIG. 3, the assembly of enclosure modules 12 is such as to provide gas flow conduit means 16 between adjacent enclosure modules 12 for directing effluent gas into enclosures 12 by way of respective valved inlets 18 and exhaust conduit means 20 for directing the filtered gas out of enclosures 12 by way of respective valved exhaust means 22. Also provided is reverse air conducting conduit means 24 for directing reverse air or gas flow into bag retaining space 26 of each enclosure 12 for purposes of filter bag cleaning by reverse gas flow through the bag fabric.

The valved effluent gas inlet 18 directs dirty gas from inlet conduit 16 into filter bags 13. The gas is then filtered through the filter bag fabric and into bag retention space 26 and is subsequently passed through the outlet 22 to exhaust conduit 20 and thence by way of suitable duct means 40 (FIG. 1.) to the atmosphere.

In practice, each of the described modular enclosure units 12 is preferably of suitable size and design for factory fabrication and shipment as a unit to the construction site and for on-site assembly. Thus, depending upon the particular design requirements of a given baghouse project, enclosure modules 12 may be generally of an elongated boxlike form as indicated in FIGS. 1 and 3, although a wide design latitude is available to the designer within the scope of the present invention. Inasmuch as the description hereinabove pertains to conventional baghouse filtering apparatus and forms no part of the instant invention, further detailed description thereof is not believed necessary. Not all of the hereinbelow described baghouse elements are shown in all preferred locations thereof in the drawings. For example, in FIG. 3 a reverse air inlet is shown only in the right hand enclosure 12 while the elevated catwalk is shown only in the left hand enclosure 12. This is purely to avoid crowding in the drawings inasmuch as each enclosure 12 may substantially include all of the features described hereinbelow.

Referring to FIGS. 1 and 3, it will be seen that each modular enclosure 12 includes a sloping or pitched roof portion 42 of conventional structure and design which, in prior baghouses, has resulted in an irregularly shaped bag retention space 26. In order to permit full utilization of bag retaining space 26 without a recourse to the use of nonuniform bags of differing length or to other needlessly costly bag or enclosure configurations the present invention contemplates a thimble floor 30 which is formed and/or fabricated to provide a profile approximately paralleling that of sloped roof portion 42 in relation to sidewall portions 44 of each modular enclosure 12. Accordingly, as shown, thimble floor 30 is subdivided into plural steps or levels 30 (designated in FIG. 3 as steps 30a, b, c, d, and e) with each step thereof having thereon plural rows of perforations 38 and thimbles 36 to which filter bags 13 are secured. Thus, at each step 30 of increasing height filter bag lower ends 13a are secured at a level higher than the level of the preceding step, and accordingly, the upper ends 13b of the respective bags 13 are located incrementally closer to the upwardly sloping pitched roof 42 whereby there is a minimum of wasted space beneath roof 42. Of course, it will be appreciated that the lateral dimensions and height of steps 30 may be varied within a wide design latitude depending on applicable design criteria including consideration of the desired slope of baghouse roof 42.

As shown in FIGS. 1 and 3, hopper portions 28 of enclosure modules 12 are disposed to extend below respective bag retaining spaces 26 subjacent stepped thimble floor 30. Hoppers 28 include downwardly converging sidewall portions 46 which define a receptacle or bin 48 within which arrested dust may be collected. Thus, it will be seen that hoppers 28 are generally of an inverted pyramidal form having an uppermost or mouth portion corresponding to the base of the pyramid as indicated by a dashed baseline 50. Accordingly, a generally triangular space 52 contiguously interfaced with the bin 48 of each hopper 28 is formed intermediate baseline 50 and thimble floor 30. A suitable gas inlet valve means such as a butterfly type damper 54 is located in gas inlet 18 and is actuatable by any suitable actuator as shown schematically at 56 to provide for selective admission of gas into triangular space 52 above baseline 50 from inlet conduit 16. The triangular space 52 thus serves to increase the effective capacity of bin 48 over that available in conventional hopper designs using the same size hopper wherein the gas inlet conventionally has directed effluent gases directly into upper regions of the pyramidal bin 48. In addition, triangular space 52 permits a greatly enlarged effluent gas inlet opening, thus resulting low velocity gas flow to produce a minimum of turbulence and thus a minimum of re-entrainment into the gas stream of dust contained in bin 48. Note that valve 54, when closed, serves as a portion of wall 44 defining one transverse extend of space 52.

Figure 2:
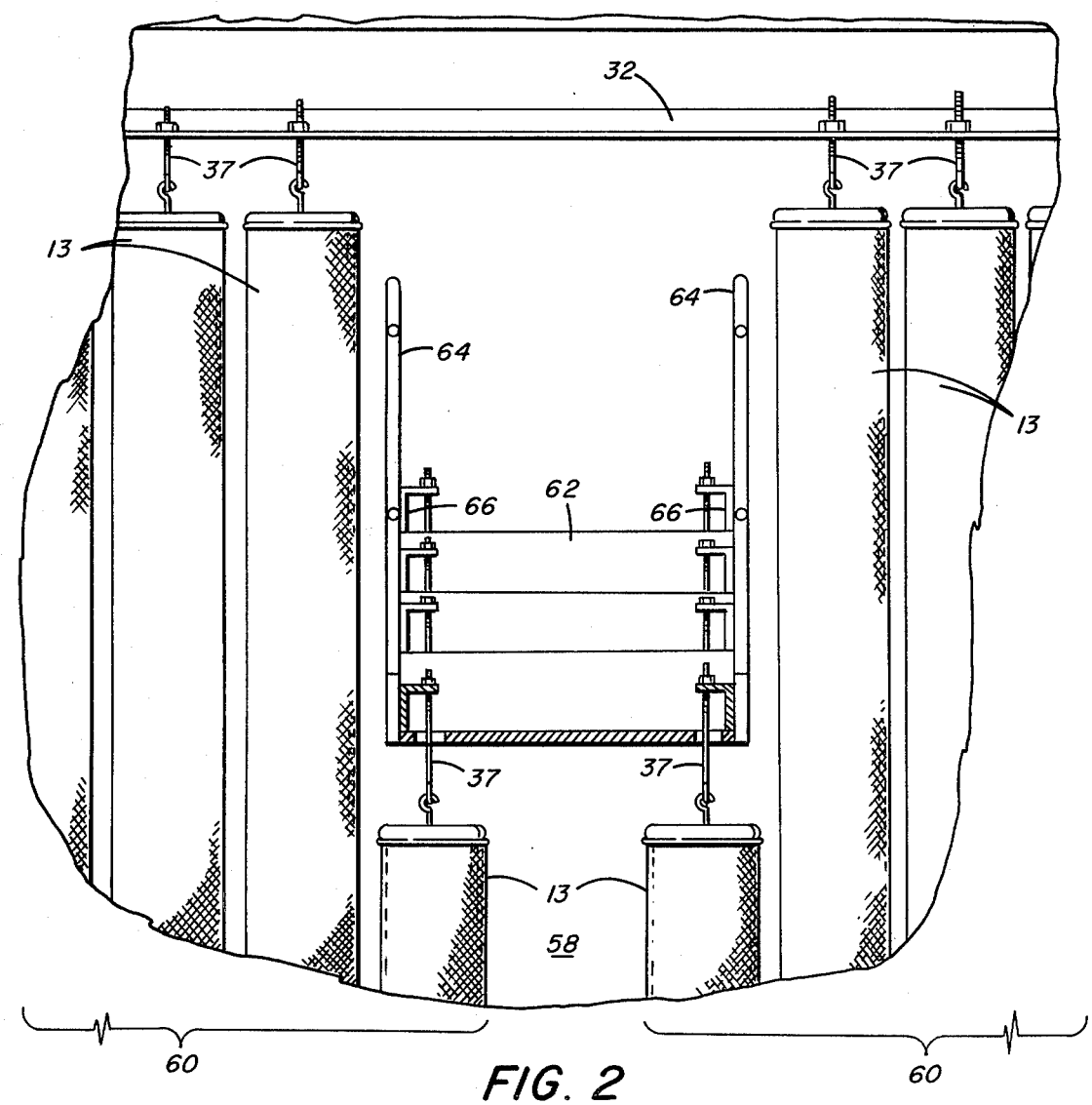
FIG. 2 is a fragmentary portion of FIG. 1 showing one embodiment of walkway according to the present invention.

Also shown in FIGS. 1, 2 and 3 are inspection and servicing walkway configurations of the present invention as follows. In each enclosure module 12 a lower walkway 57 is defined on thimble floor 30 (FIG. 1) and extends laterally thereacross between opposite sidewall portions 44 in stepwise fashion. The width of walkway 57 is determined by the width of a passage 58 formed by a spacing between adjacent banks 60 of filter bags 13. A suitable width may be, for example, approximately 18 inches, and this passage 58 extends upwardly throughout the upward extent of the most closely adjacent rows of bags 13 in the respective adjacent banks 60 as shown in FIG. 2. An upper or elevated walkway is additionally provided in the form of a laterally extending stepped catwalk 62 located directly above lower walkway 57 and rigidly supported adjacent the upper ends of the longer of filter bags 13 as shown. Catwalk 62 is located above and laterally overlaps upper ends 13b of the respective most closely adjacent rows of bags 13 in the respective adjacent banks 60. Accordingly, catwalk 62 may be wider than the bag spacing (i,e, 18 inches) which defines lower walkway 57. For example, in one suitable design with a lower walkway width of 18 inches as hereinabove mentioned, catwalk 62 may have a width of approximately 36 inches. Each catwalk 62 includes suitable handrails 64 and toeplates 66 for the safety of personnel.

Inasmuch as catwalks 62 laterally overlap certain rows of bags 13 in the adjacent banks 60, several advantages are realized. First, the catwalk width is limited only by the spacing between the respective second rows of bags 13 in each bank 60 and thus may be wider than conventional catwalks with no increase in overall spacing between the adjacent filter bag banks 60. Second, because catwalk 62 overlaps a portion of each adjacent bank 60, the maximum reach to bags 13 located interiorly of each bank 60 is reduced over comparable conventional arrangements with the same number and size of bags. Also reduced over comparable conventional structures is the number of rows of filter bags 13 one must reach past for access to such interiorly located bags. For access to the shortened bags 13, supported beneath catwalk 62 one may readily reach over the edge of catwalk 62, however, if the bag retention means 37 is accessible from the inside of toeplates 66 as shown in FIG. 2, access to these bags is also eased.

An additional advantage of the described catwalk arrangement is that the overall dimensions of enclosure module 12 may be reduced over comparable conventional designs. That is, in a conventional baghouse with full length filter bags the 18 inch spacing for lower walkway 57 would only provide sufficient space for a slightly narrower upper catwalk (which would be considerably more difficult to use and less safe than the catwalk of the present invention). Thus, in conventional comparable baghouses a wider upper catwalk would require increasing the spacing between the respective adjacent banks of bags from top to bottom thereby needlessly increasing the total volume encompassed by enclosure module 12 with no attendant increase in filtering capacity. This would also result in an unnecessarily wide lower walkway inasmuch as the inherent danger in use of the lower walkway is minimal and a narrower lower walkway therefore would appear to present no undue danger. Moreover, in conventional baghouse designs the excessive reach required to reach bags located interiorly of a given bank cannot be overcome by widening of the upper catwalk as this requires increasing the spacing between the adjacent banks. Only by providing more catwalks for the number of filter bags or alternately, fewer rows of bags in each bank, could prior baghouse designs permit easier and closer access to the interior bags and this also results in baghouse enclosures which are larger than required for the desired filtering capacity. By contrast, in the present invention the overall dimension components of enclosure modules 12 attributable to the inclusion therein of upper and lower walkways 62, 57 of adequate width may be smaller than those considered necessary for walkways of equal width in the prior art, even through according to this invention, upper catwalk 62 is in fact wider, and therefore safer, than those considered adequately wide heretofore.

Figure 4:
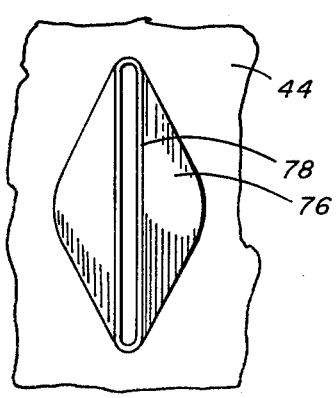
FIG. 4 is a fragmentary elevation taken on line IV—IV of FIG. 3 and showing a reverse air diffuser.

Referring now to FIGS. 1, 3 and 4 baghouse 10 provides a reverse air conducting means 24 including suitable conduits 68 communicating in gas flow conducting relation between a source of reverse air flow such as a centrifugal fan 70 and bag retention spaces 26 of each enclosure module 12 by way of an inlet 72, which includes valve means such as a butterfly damper 74 conventionally operable by any suitable actuator means (not shown). Preferably, the fan 70 is employed to build up a pressure head in the volume of conduit means 68 between fan 70 and reverse air inlet valve 74. Inlets 72 are located adjacent a lower portion of each respective bag retention space 26 whereby fan 70 may be mounted at grade rather than upon the supporting structure 14 or on the baghouse itself. This provides a distinct advantage in that prior reverse air fans mounted on the structural framework or on the modular enclosures have often been low speed fans with a frequency of operation quite close to the natural frequency of the structural framework on which they were mounted. Accordingly, such arrangements have been known to induce undesirable vibration in the baghouse structure. As shown in FIGS. 3 and 4 each reverse air inlet 72 includes an inlet diffuser means 76 formed with a vertically elongated inlet slot 78 to diffuse the reverse air flow in a generally vertical plane as indicated by arrows A in FIG. 3 whereby a superior reverse gas flow bag cleansing action is achieved as described hereinbelow. Inlets 72 preferably are generally in alignment with the plane of spacing 58 between adjacent banks 60, between adjacent rows of filter bags 13, or between a bank 60 and an adjacent enclosure wall 44. Accordingly, upon initiation of reverse flow air is quickly and efficiently distributed through the space 58 within a generally vertical plane for rapid and uniform distribution of the reverse air flow throughout the modular enclosure 12. In practice, the reverse air flow is initiated by operating fan 70 to develop a pressure head within the reverse air conduits between the reverse air valves 74 and the fan 70 whereby, upon the sudden opening of the valves 74, a pressure wave or pulse of reverse air emanates from diffuser slot 78 in a generally vertical plane between banks 60 and toward the enclosure module back or inner vertical wall 44. This initial air pulse is followed by a return pulse reflected from back wall 44 to produce a shock wave affect which rapidly deflates filter bags 13 thereby dislodging accumulated dust therefrom. The reverse air pressure pulse preferably is a momentary condition and this is ensured in the present invention inasmuch as the reverse air pressure within each enclosure 12 will tend to stabilize at a uniform pressure as the pressure head in conduits 68 decreases.

According to the description hereinabove there is provided by the present invention a novel baghouse filtering apparatus including but not limited to improved space utilization within the bag retention enclosure portions of the apparatus, improved effluent gas and reverse air inlet means, and improved access means for access of operating personnel to the filter bags. Inasmuch as this description is not intended to be exhaustive, for only certain preferred embodiments of the invention are described herein, alternate embodiments may suggest themselves to those versed in the art and it is therefore not intended that the invention be limited by this description. For example, it is contemplated that a continuously sloping thimble floor and/or catwalk according to the present invention may be provided in lieu of the stepwise floor and catwalk; the various gas inlet, reverse air inlet and gas outlet valves may take any of numerous forms such as butterfly, poppet or guillotine type valves; diffuser 76 may take any of various alternate forms; the impetus for reverse air and effluent gas flow may be provided by pressure means upstream from the baghouse, or by suction means downstream from the baghouse, or by combination of these; catwalk 62 may overlap bags on only one side of spacing 58 rather than on both sides, or other catwalks may be disposed over foreshortened filter bags interiorly of any bank 60 for access to interiorly located bags; and the like.

These and other embodiments and modifications having been envisioned and anticipated by the inventor, it is respectfully submitted that the invention should be interpreted as broadly as permitted by the scope of the claims appended hereto.

I claim:

1. In a baghouse gas filtering apparatus including an array of elongated fiber bags retained therewithin and arranged as a plurality of generally parallel rows of said filter bags, the improvement comprising:

elongated walkway means disposed adjacent selected filter bags in one of said rows of filter bags and extending along said one row transversely of the axial extent of said selected filter bags and intermediate the axial ends thereof;

and said walkway means being disposed adjacent other selected filter bags in another of said rows of filter bags adjacent said one row of filter bags and extending along said another row transversely of the axial extent of said other selected filter bags and axially outward of one axial end thereof in a manner that said walkway means overlies and laterally overlaps said other selected filter bags.

2. A baghouse apparatus as claimed in claim 1 additionally including filter bag securing means cooperable with securing portions of said walkway means for maintaining said others of said filter bags in said another of said rows of filter bags in an operative position thereof.

3. A baghouse apparatus as claimed in claim 1 wherein said walkway means extends adjacent and laterally intermediate a pair of tranversely spaced apart rows of filter bags; at least one of said rows of filter bags having located directly thereto a respective said another of said rows of filter bags within the space between said transversely spaced apart rows of filter bags and said walkway means overlies said another of said rows of filter bags.

4. A baghouse apparatus as claimed in claim 3 wherein each of said tranversely spaced apart rows of filter bags has located directly adjacent thereto a respective said another of said rows of filter bags within the space between said transversely spaced apart rows of filter bags and said walkway means overlies each of said another of said rows of filter bags.

5. A baghouse apparatus as claimed in claim 4 wherein the respective said another rows of filter bags are transversely spaced apart to accomodate the transverse extent of other walkway means located therebetween.

6. In a baghouse gas filter apparatus including an enclosure having a filter bag housing portion laterally bounded by upstanding sidewalls and which is adapted to carry in generally longitudinally coextending relation a plurality of elongated filter bags for filtering of gas passed from a gas inlet formed in one of said sidewalls through such filter bags and wherein a hopper portion of said enclosure is located adjacent said filter bag housing portion to communicate with interior portions of the filter bags to receive matter which accumulates therewithin during such gas filtering, the improvement comprising:

partition means located to separate said filter bag housing portion from said hopper portion;

said partition means including a plurality of filter bag securing means for securing axial end portions of respective ones of such filter bags with respect to said partition means;

aperture means penetrating said partition means to permit communication between such interior portions of such filter bags and said hooper portion for passing of gas to be filtered into such filter bags and for passing of matter from such filter bags into said hopper;

said partition means forming a plurality of step portions associated with selected ones of said filter bag securing means and extending across the lateral extent of said enclosure intermediate said one of side sidewalls and another of said sidewalls with each of said step portions being spaced from the adjacent said portion and from said hopper portion in a manner that one of said step portions is located adjacent said one of said sidewalls and is spaced from said hopper portion by a maximum spacing whereby said gas inlet is disposed intermediate said partition means and said hopper portion and each successive said step portion is spaced from said hopper portion by a spacing which is smaller than the spacing therefrom of the preceding said step portion and smaller than said maximum spacing.

7. A baghouse apparatus as claimed in claim 6 wherein certain of said filter bag securing means are spaced in said direction of the longitudinal extent of said filter bags from others of said filter bag securing means.

8. A baghouse apparatus as claimed in claim 7 wherein the positional relationship between said ones of said step portions determines the magnitude of the spacing in said direction of the longitudinal extent of said filter bags between the respective associated said certain and said others of said filter bag securing means.

* * * * *

UNITED STATES PATENT AND TRADEMARK OFFICE
CERTIFICATE OF CORRECTION

PATENT NO. : 4,261,714
DATED : April 14, 1981
INVENTOR(S) : Harley G. Peterson

It is certified that error appears in the above-identified patent and that said Letters Patent are hereby corrected as shown below:

Column 7, line 39 after directly insert --adjacent--.

Column 8, line 33 after adjacent said insert --step--.

Signed and Sealed this

Seventh Day of July 1981

[SEAL]

*Attest:*

RENE D. TEGTMEYER

*Attesting Officer*     *Acting Commissioner of Patents and Trademarks*